March 3, 1931. H. D. ELFRETH 1,794,841
FILTRATION SYSTEM
Original Filed Jan. 11, 1924   3 Sheets-Sheet 1

INVENTOR.
Harold D. Elfreth
BY Cornelius D. Ehret
his ATTORNEY.

March 3, 1931. H. D. ELFRETH 1,794,841
FILTRATION SYSTEM
Original Filed Jan. 11, 1924   3 Sheets-Sheet 2
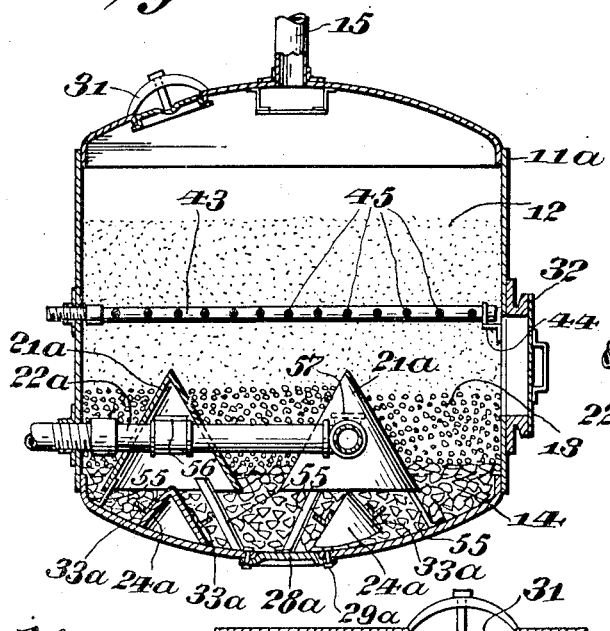
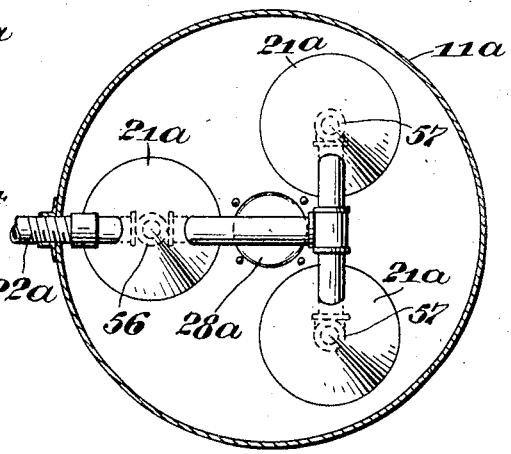
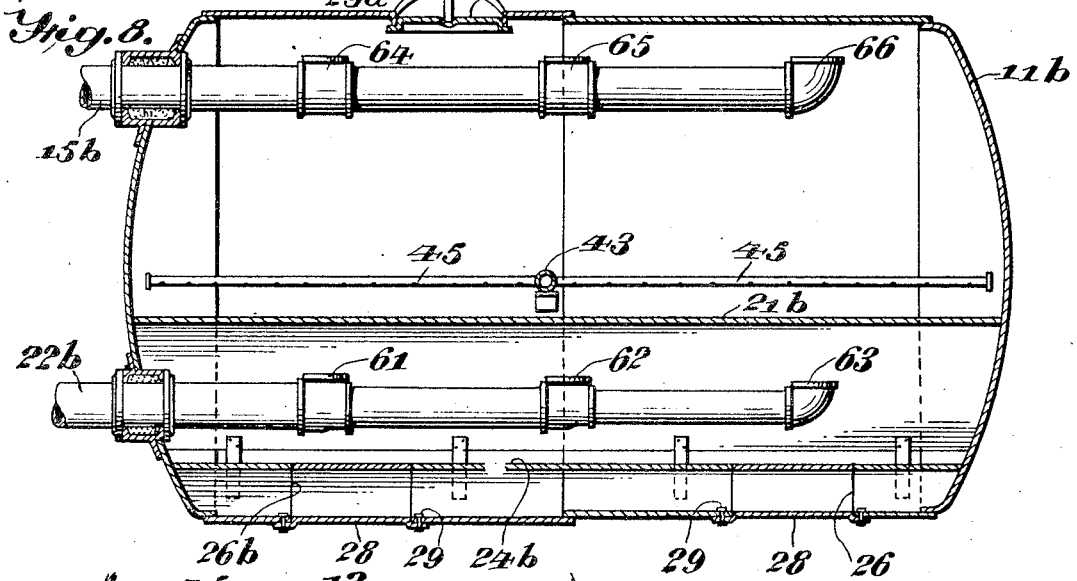
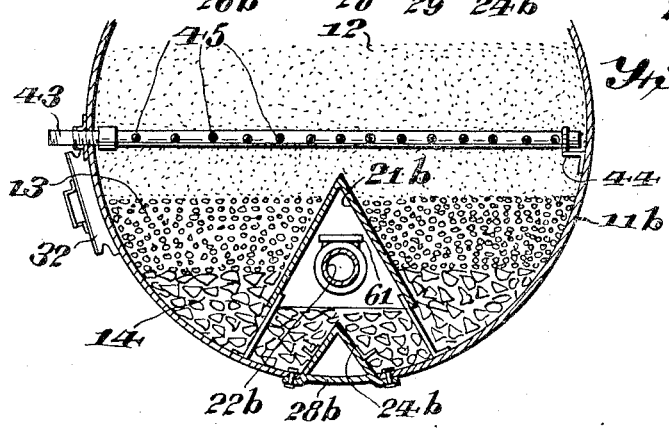
INVENTOR.
Harold D. Elfreth
BY Cornelius D. Ehret
his ATTORNEY.

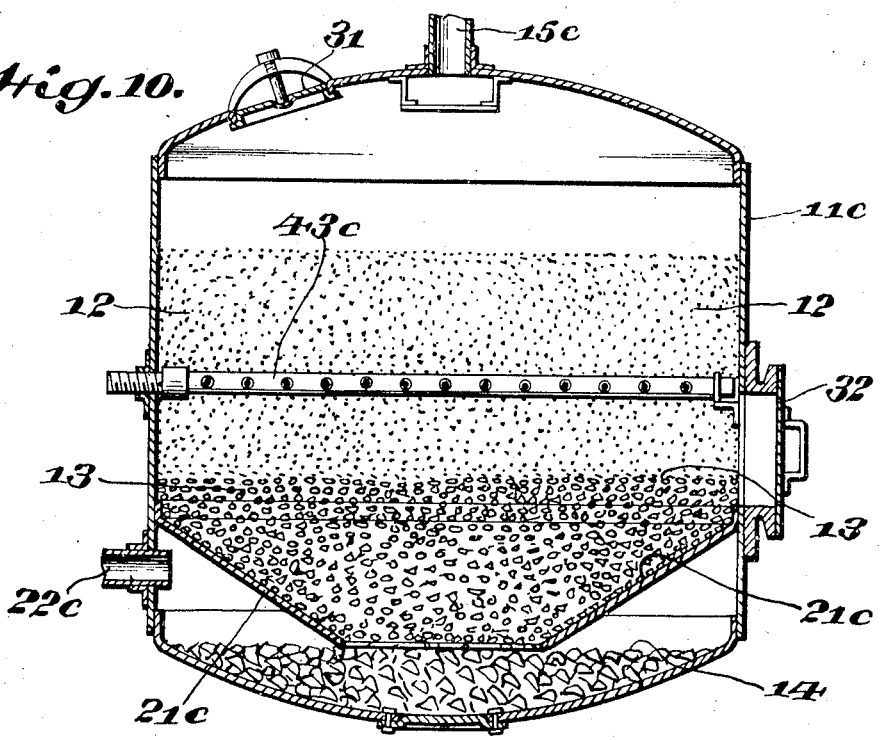
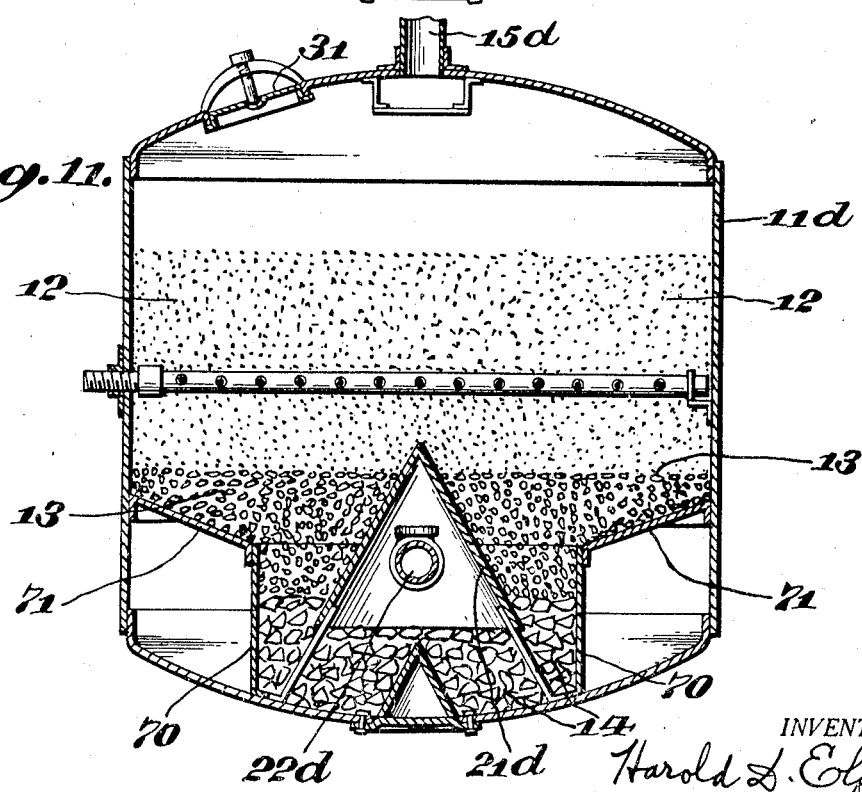

Patented Mar. 3, 1931

1,794,841

UNITED STATES PATENT OFFICE

HAROLD D. ELFRETH, OF PENNS PARK, PENNSYLVANIA, ASSIGNOR TO COCHRANE CORPORATION, OF PHILADELPHIA, PENNSYLVANIA, A CORPORATION OF PENNSYLVANIA

FILTRATION SYSTEM

Application filed January 11, 1924, Serial No. 685,529. Renewed March 27, 1929.

My invention relates to a method of and apparatus for filtering liquids, and particularly of a character for preventing passage of sand or filter medium from the filter with the outflowing water.

Heretofore, it has been customary to pass the filtered water through screens, striners or strainer valves to prevent passage of sand or other filter medium with the water to pumps or other apparatus where damage would occur. While these arrangements have reduced the danger of escape of sand, trouble has been experienced through clogging of the screens or strainer structure and breakage thereof, in which latter case some of the sand would escape and cause damage before the break was discovered. Furthermore, there is considerable expense incident to the installation of these screening and strainer devices and to cleaning and repairing them.

In many of the old installations the filtered water outlet is located at a point above the bottom of the tank or filter chamber, leaving a dead water space below the outlet in which sludge and bacteria accumulate. To avoid this latter condition, concrete is sometimes placed in the bottom of the filter tank, but this arrangement is objectionable in that workmen must enter the tank and shovel the filter bed of sand and gravel out through a man-hole near the top of the tank whenever it is desired to renew the filter bed with fresh sand and gravel.

One object of my invention is to effectively separate the sand or other filter medium from the filtered water without recourse to screens or strainer structure.

Another object of my invention is to provide a filter tank of such construction that there is substantially no dead water space and that the filter bed may be removed or dumped through the bottom of the tank.

My arrangement also permits the filter bed to extend nearer to the bottom of the tank, making possible employment of tanks of less height for a given thickness of filter bed.

Still another object of my invention is to provide means for causing wash water to flow through at least the entire surface area of the filter bed, instead of following only certain paths therethrough.

A further object of my invention is to simplify and improve generally filtering methods and apparatus.

For an understanding of my method and for an illustration of some of the various forms my apparatus may take, reference is had to the accompanying drawings, in which:

Fig. 6 is a sectional view, in side elevation, of a modified form of filter tank.

Fig. 7 is a sectional plan view of the apparatus of Fig. 6.

Fig. 8 is a longitudinal sectional view, in side elevation, of another modification of my invention, with the filter medium omitted.

Fig. 9 is a transverse sectional view of a portion of the apparatus of Fig. 8.

Fig. 10 is a sectional view, in side elevation, of still another modification.

Fig. 11 is a view showing a manner in which guide baffles may be employed in connection with the devices of Figs. 1 to 9.

Figure 1:
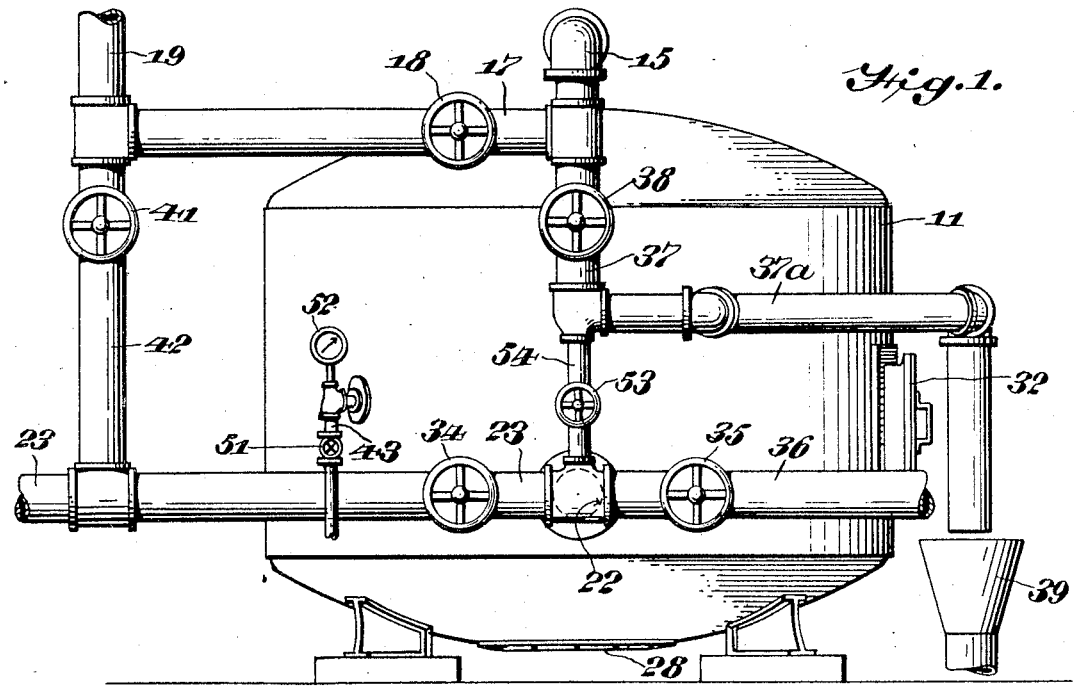
Fig. 1 is a view, in side elevation, of filtering apparatus embodying my invention.
Figures 2, 3:
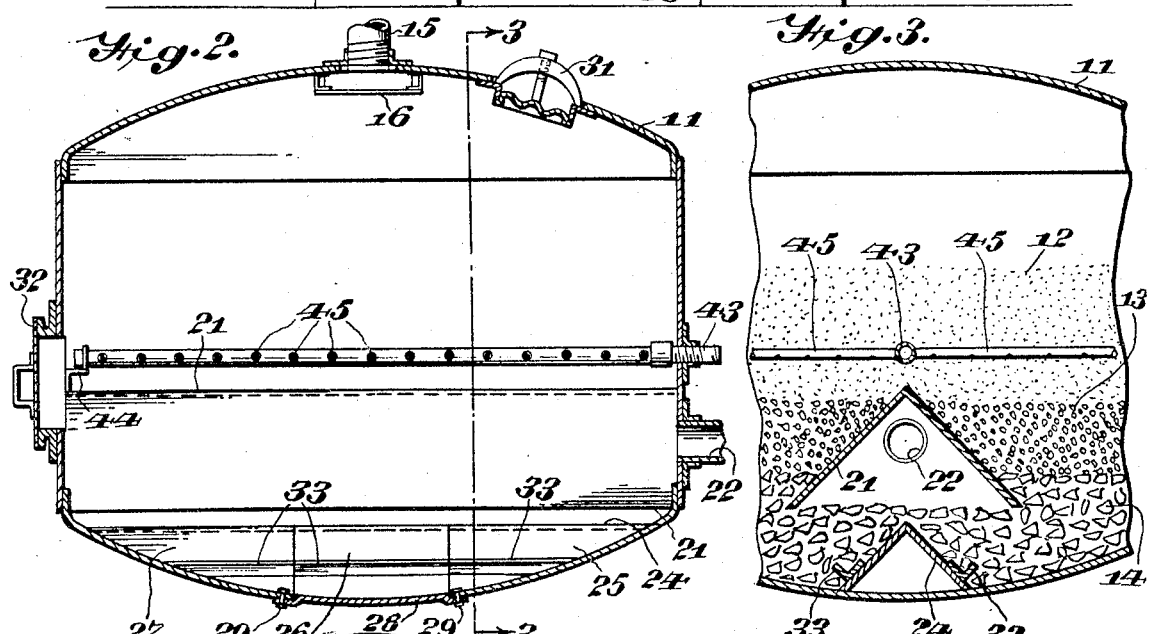
Fig. 2 is a vertical sectional view of a portion of the apparatus shown in Fig. 1, with the filter medium omitted.
Fig. 3 is a sectional view taken on the line 3—3 of Fig. 2.

Referring more particularly to Figs. 1, 2 and 3, my apparatus comprises a filter tank 11 containing a filter bed composed of any suitable filter medium, as, for example, a body of sand 12, and layers 13 and 14 of coarser material such as gravel, for supporting the sand 12. Raw or unfiltered water is introduced into the tank 11 through a pipe 15 beneath which is a baffle plate 16 to prevent excessive agitation of the filter bed. The pipe 15 communicates with a pipe 17, controlled by a valve 18, through which raw or unfiltered water is introduced from a pipe 19. Water flowing downwardly through the pipe 15 past the baffle plate 16 passes through the filter bed 12, 13, 14 to a point or region adjacent the bottom of the tank 11 from which point it flows around the lower edges of an up-take chamber 21 which is of inverted trough form having its ends welded or otherwise secured to the side wall of the tank 11, so that no water from the filter bed may flow into said chamber 21 except under the lower edges thereof.

The water flows from the up-take chamber 21 through an outlet pipe 22 and thence through a pipe 23 to the point of storage or consumption (not shown).

In order that none of the sand or other filter medium which may have worked its way through the gravel 13, 14 may be carried into the up-take chamber 21 and into the outlet 22, the area of fluid path at the lower edge of the up-take chamber is so proportioned to the area of the filter bed that the velocity of the water as it enters upwardly into the up-take chamber will not be so great as to carry with it any grains of sand or gravel, thus avoiding the necessity of placing a screen over the entrance to the outlet 22 or at any other point in the path of flow.

In the form shown, there would ordinarily be a dead water space immediately beneath the up-take chamber 21, in which sediment and bacterial growth would accumulate. To avoid this I provide a filler member 24 of inverted trough-like form, thereby constricting the path of flow into the chamber 21 to effect velocity sufficient to prevent sedimentation and yet insufficient to carry filter medium into chamber 21. The member 24 is composed of sections 25, 26 and 27. The lower edges of the end sections 25 and 27 are welded or otherwise secured to the bottom of the tank 11, while middle section 26 is secured, by welding or otherwise, to a door 28 detachably fastened to the tank 11 by bolts 29 removable from time to time to permit dumping of the filter medium 12, 13, 14 through the bottom of the tank, thus avoiding the necessity of shoveling the sand and gravel through one of the man-holes 31 or 32 in accordance with the common practice, and rendering it unnecessary to disturb the up-take chamber and air spray pipes when re-placing a filter bed.

To prevent the coarse material 14 of the filter bed from being forced, by the weight of the material 12, 13 thereabove, along the bottom of the tank and upwardly into the up-take chamber, I provide flanges or angle irons 33 on the filler member 24 which prevent creeping or sliding of the gravel along the bottom wall of the tank 11.

When it is desired to clean the filter bed, the flow of water through the pipe 17 is shut off by means of the valve 18 and the valve 34 closed to prevent passage of water through the pipe 23. A valve 35 is then opened to admit from a pipe 36 wash water which flows through the passage 22 into the up-take chamber, then downwardly through and around the lower edge of said chamber and upwardly through the filter bed whence it passes out through the pipe 15 and downwardly through a pipe 37 controlled by a valve 38, through waste water conduit 39 to sewer or elsewhere. The wash water thus passes through the filter in a direction the reverse of that taken by the filtered water. While wash water is being admitted to the filter and the valves 18 and 34 are closed, a valve 41 may be opened to permit raw or unfiltered water to pass from the pipe 19 through a pipe 42 to the pipe 23, whenever it is desired to avoid interruption in the supply of water to a point of consumption.

Figures 4, 5:
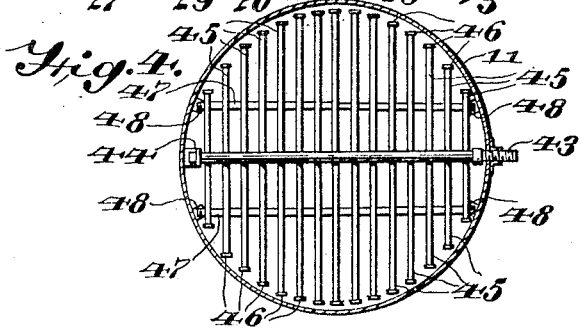
Fig. 4 is a plan view of a portion of the apparatus shown in Fig. 2.
Fig. 5 is a detail view of an air spray pipe.

In order that the filter material 13 may be more effectively cleaned than by simple reverse flow of wash water therethrough, I provide a pipe 43 through which air under pressure is supplied. This pipe extends into the tank and is supported at its inner end by a clip 44 welded or otherwise fastened to the side of the tank 11. The pipe 43 serves as a manifold into which a plurality of pipes 45 are tapped from either side, such pipes being provided with caps or closure members 46. The branch pipes 45 are supported by bars 47 which are mounted upon clips 48 welded or otherwise secured to the walls of the tank 11. The branch pipes 45, as shown more clearly in Figs. 3 and 5, are provided with downwardly directed orifices 49. When the valves 34 and 18 have been closed, and the valve 38 opened (the valve 35 still remaining closed) air may be admitted through the pipe 43 into the pipes 45 imbedded in the filter bed. The air thus admitted passes up through the water in the filter bed loosening the sand and carrying with it some of the sludge lodged in the sand. Ordinarily, the valve 51 which controls the supply of air is closed before the valve 35 is opened to admit wash water, but if the pressure of the wash water is not too great, air may be admitted simultaneously with the wash water, without carrying sand off with the waste water.

After completion of a washing operation, the valves 35, 38 and 41 are closed and the valve 18 then opened to admit raw or unfiltered water to the filter. Previous to opening the valve 34 a valve 53 which controls a by-pass pipe 54 leading from the outlet 22 to the waste water pipe 37a is opened so that the remnants of wash water contained in the filter may be driven off by directing the filtered water to the waste pipe 37a for a short time. The valve 53 may then be closed and the valve 34 opened to resume normal filtering operation.

A gage 52 is provided for indicating the air pressure admitted through the pipe 43. The manhole 31 is provided for introduction of filtering material therethrough or for access to the interior of the tank, while the manhole 32 also provides access to the tank and serves as a passage through which some of the apparatus within the tank may be removed.

Referring now to Figs. 6 and 7, the outside piping connections are the same as shown in Fig. 1 and are therefore not indicated in detail. Instead of a trough-like up-take chamber as in Figs. 1 to 3, I have shown in this figure up-take chambers 21a of conical shape that are supported on legs 55 welded or otherwise secured to the bottom of the tank 11a. The pipe 22a serves as an outlet for the up-take chambers 21a and communicates therewith by means of a T member 56 in one case and by L's 57 with the other two up-take chambers.

A conical filler member 24a is welded to the bottom of the tank 11a beneath each of the up-take chambers 21a and has angle irons or flanges 33a secured thereto to prevent passage of gravel into the up-take chamber.

A door 28a is provided in the bottom of the tank 11a to permit the dumping of material therethrough. Wash water may be admitted to the filter through the pipe 22a in a direction the reverse of that taken by the filtered water and drained to waste in substantially the same manner as shown in Fig. 1, air for loosening and agitating the filter bed being admitted through the manifold pipe 43 and the branch pipes 45.

In Figs. 8 and 9, still another form of filter is shown. This resembles the form of apparatus shown in Fig. 1 in that the up-take chamber is of inverted trough shape, but the outlet 22b is provided with T's 61 and 62 and an L 63 through all of which filtered water may flow from the up-take chamber 21b to the outlet 22b instead of entering the pipe 22b directly, through a single opening.

In this form, as in the form shown in Fig. 1, a filler member 24b of trough-like form is mounted beneath the up-take chamber 21b and is provided with sections 26b that are secured to cover members 28b which, when removed, permit the dumping of screening material through the bottom of the tank 11b. The air supply pipe or manifold 43 and branch pipes 45 are of substantially the same form as shown in Fig. 1.

Another point of distinction between the form of apparatus shown in Fig. 8 and that shown in Fig. 1 resides in the inlet 15b which in Fig. 8 enters the tank horizontally instead of vertically and is provided with T members 64 and 65 and an L member 66 through which raw or unfiltered water enters from the pipe 15a and through which wash water is directed when cleaning the tank. The pipe connections may be in other respects the same as those shown in Fig. 1, the pipes 15b and 22b being each provided with a plurality of openings because of the greater area of filter bed possible in the apparatus of Fig. 8.

From the foregoing description, it will be seen that I provide what may be termed a gravity method for separating water from the filtering sand, thereby avoiding the necessity of using screens or strainers to separate the water and sand, and eliminating the first cost of installing screens and the cost of keeping them in repair and from becoming clogged. Further, that I provide means for preventing what would ordinarily be dead space below the up-take chamber, or outlet for the filter water, and at the same time provide means for dumping the filter bed through the bottom of the tank, and that I provide an effective method of and apparatus for filtering liquids wherein the steps necessary and the apparatus required are reduced to a minimum.

In order to insure that the wash water flowing from the pipe 22 down through the up-take chamber and upwardly through the filter bed, as above explained, is distributed substantially uniformly through the entire surface of the filter bed so as to thoroughly wash the same, I provide the constructions shown in Figs. 10 and 11. Wash water flowing around the lower edges of the up-take chambers of Figs. 1 to 9 is directed somewhat toward the side wall of the tank and may tend to flow upwardly through paths adjacent thereto, instead of being distributed across the entire cross sectional area of the filter. The path of least resistance to flow is at the point of contact between the filter bed and the side walls of the filter tank.

In Fig. 10, I provide a filter tank 11c which may be of the general form shown in Figs. 6 and 7. This tank is provided with the usual filter bed 12, 13, 14—and air pipe 43c through which air is admitted to loosen the sand 12. A normal outlet 22c is also provided, but instead of providing an up-take chamber of cone or trough shape I provide an up-take chamber 21c, which may be of inverted cone shape and has its upper edge welded or otherwise secured to the side wall of the tank. During the filtering operation, water flows through inlet 15d, down through the filter bed, past the lower edge of 21c and upwardly to the outlet 22c. The operation of this filter is the same as that of the other forms above described. When wash water is admitted from 22c it flows beneath the lower edge of the member 21c and thence upwardly through the filter bed. It has been found that, by this construction, there is no tendency for the wash water to flow along the wall of the tank and that it will be distributed evenly throughout at least the top portions of the bed above the member 21c and thus effectively wash that part of the filter bed with which the raw water first contacts.

In the structure of Fig. 11, unfiltered water is admitted through pipe 15d, flows through the filter bed 12—13—14 beneath the lower edges of the up-take chamber 21d and thence through the outlet 22d, in the manner described in connection with Fig. 6. This form of apparatus contains an additional feature, namely a guide baffle 70 which, when the up-take chamber 21d is of conical form, is cylindrical in shape and rests upon the bottom of the tank 11d. At its upper edge the baffle 70 is welded or other wise secured to a ring-like member 71, which holds the baffle 70 in proper position and also seals off the dead space in the angle formed by the members 70 and 71, to prevent the accumulation of sediment between the member 70 and the wall of the tank 11d.

Wash water admitted through the pipe 22d flows beneath the lower edges of the member 21d and is prevented, by the baffle member 70, from closely following the interior wall of the tank to the exclusion of the central portion thereof. By this construction also, the up-flow of wash water is effectively distributed throughout substantially the entire surface area of the filter bed and subjects all portions thereof to the washing operation.

The forms of apparatus shown in Figs. 10 and 11 are also applicable to the trough-like forms of apparatus shown in Figs. 1, 2, 3, 8 and 9. If a plurality of conical up-take chambers, as in Fig. 6 are employed, a single cylindrical baffle member may surround them all.

In the appended claims, the expressions "surface area" or "top portion" of the filter medium are to be understood as meaning that part of the filter medium enclosed by the wall or walls of the tank and extending for a few inches downwardly. Further, the expression "uptake chamber" appearing herein and in the appended claims is to be understood as comprehending a distributing and collecting chamber.

Various detail changes may be made without departing from the spirit and scope of the invention as defined in the accompanying claims.

What I claim is:

1. Filtering apparatus comprising a tank, an up-take chamber in said tank, means for directing liquid downwardly in said tank and into said up-take chamber, a door for said tank disposed beneath the up-take chamber, and a filler member carried by the inner side of said door and partially filling the space in the tank directly beneath said up-take chamber.

2. Filtering apparatus comprising a tank, an up-take chamber in said tank, means for directing liquid downwardly in said tank and into said up-take chamber, and a removable filler member partially filling the space in the tank beneath said up-take chamber.

3. Filtering apparatus comprising a tank, an up-take chamber in said tank, means for directing liquid downwardly in said tank and into said up-take chamber, a removable filler member partially filling space in the tank beneath said up-take chamber, and means for removing said filler member through the bottom of the tank.

4. Filtering apparatus comprising a tank, an up-take chamber of inverted trough form disposed within said tank, a filler member of inverted trough form disposed beneath said up-take chamber and means for removing a portion of said filler member through the bottom of said tank.

5. Filtering apparatus comprising a tank, an up-take chamber of inverted trough form disposed within said chamber and having the ends thereof sealed against the flow of fluid therethrough, a filler member of inverted trough form disposed beneath said up-take chamber, and a door in the bottom of the tank beneath said filler member.

6. Filtering apparatus comprising a tank, an up-take chamber within said tank, a filler member disposed beneath said up-take chamber, and a door in the bottom of said chamber at a point beneath said filler member.

7. Filtering apparatus comprising a tank, an up-take chamber within said tank, a filler member disposed beneath said up-take chamber, and a door in the bottom of said chamber.

8. Filtering apparatus comprising a tank, a plurality of up-take chambers within said tank, a filler member disposed beneath each of said up-take chambers, and a door for the bottom of said tank disposed at a point adjacent to the center of said bottom.

9. Filtering apparatus comprising a tank, an up-take chamber within said tank, and a filler member mounted in said tank beneath said up-take chamber.

10. Filtering apparatus comprising a tank, an outlet member in said tank located at a point above the bottom thereof, and a filler member disposed beneath said outlet member, said filler member having its top portion of smaller cross-sectional area than its bottom portion.

11. Filtering apparatus comprising a tank, an up-take chamber located within the tank and having its lower edge spaced from the side wall and bottom of said tank, and baffle means comprising a substantially vertically disposed wall disposed between said side wall of the tank and said lower edge of the up-take chamber.

12. Filtering apparatus comprising a tank, an up-take chamber within said tank, a filter bed disposed above said up-take chamber, means for causing a reverse flow through said up-take chamber, and means comprising a substantially vertically disposed wall spaced from the side wall of said tank for effecting substantially uniform distribution of said reverse flow after it emerges from said up-take chamber.

13. Filtering apparatus comprising a tank, a filter medium in said tank, means comprising an up-take chamber for establishing a flow of liquid at or adjacent the bottom of said medium, and means comprising a substantially vertically extending wall spaced substantially uniformly from the internal periphery of said tank for initially preventing the liquid from engaging said tank and another wall inclined with respect to said first-mentioned wall for thereafter permitting liquid distribution across substantially the entire area of said filter medium.

14. Filtering apparatus comprising a tank, a filter medium and an uptake-chamber in said tank, means for introducing raw water above said filter medium, means for introducing wash water to said uptake-chamber from whence it flows downwardly therethrough and then upwardly through said filter medium, and means comprising a wall space from the bottom of said tank directing water downwardly and inwardly to said uptake-chamber and wash water upwardly from said uptake chamber with subsequent substantially uniform diffusion through said medium.

15. Filtering structure comprising a tank, a filter medium resting on the bottom of said tank, an uptake chamber disposed in said filter medium, means for introducing wash water to said uptake chamber from whence it flows downwardly therethrough and then upwardly through said filter medium, and means spaced from a wall of said tank for initially preventing the wash water from engaging said tank.

16. Filtering structure comprising a tank, a filter medium resting on the bottom of said tank, an uptake chamber disposed in said filter medium, means for introducing wash water to said uptake chamber from whence it flows downwardly therethrough and then upwardly through said filter medium, a substantially vertically extending wall spaced from said tank for initially preventing the wash water from engaging said tank, and a second wall resting upon said first-mentioned wall and inclined with respect thereto for permitting distribution of the wash-water throughout substantially the entire area of the filter medium.

17. Filtering structure comprisng a tank, a filter medium in said tank, an uptake-chamber disposed in said filter medium, means for introducing wash-water to said uptake-chamber from whence it flows downwardly therethrough and then upwardly through said filter medium, and baffled means spaced from and surrounding said uptake-chamber and forming a vacant chamber with the outside wall and bottom of said tank.

18. Filtering apparatus comprising a tank having a sloping false bottom, a cylindrical partition registering with an opening in said false bottom and extending to the actual bottom of said tank, a hollow conical member having its base surrounded by said cylindrical partition, a raw water conduit in communication with the interior of said conical member, and an outlet conduit in communication with the interior of said tank adjacent the top thereof.

19. The combination with the shell of a fluid treating chamber adapted to contain a bed of treating material resting in part directly on the bottom of said shell and having downwardly converging sides, a single material-supporting structure of less area than the bed of material and having diverging sides extending downwardly to the open bottom thereof, means for securing said structure to said shell to provide a passage for flow of fluid between said shell and the bottom of said structure, and a pipe communicating with the interior of said structure through said shell, said passage extending entirely around the lower edge of said structure and traversed by all fluid flowing between said shell and the interior of said structure.

20. Filtering apparatus comprising a tank, a filter medium and an uptake chamber in said tank having an open bottom and downwardly diverging sides, means for introducing raw water above said filter medium, means for introducing wash water to said uptake chamber from whence it flows downwardly therethrough and then upwardly through said filter medium, and a sloping conical false bottom for directing raw water downwardly and inwardly to said uptake chamber and wash water upwardly from said uptake chamber with subsequent substantially uniform diffusion through said medium.

In testimony whereof I have hereunto affixed my signature this 9th day of January, 1924.

HAROLD D. ELFRETH.